United States Patent [19]
Wu

[11] 3,779,220
[45] Dec. 18, 1973

[54] DISTRIBUTOR VACUUM SPARK ADVANCE CONTROL VALVE WITH REGULATOR

[75] Inventor: Tao-Yuan Wu, Ann Arbor, Mich.

[73] Assignee: Ford Motor Company, Dearborn, Mich.

[22] Filed: Mar. 8, 1972

[21] Appl. No.: 232,806

[52] U.S. Cl.............................. 123/117 A, 123/97 B
[51] Int. Cl............................................... F02p 5/04
[58] Field of Search.................... 123/117 A, 117 R, 123/97 B

[56] References Cited
UNITED STATES PATENTS

| | | | |
|---|---|---|---|
| 3,626,914 | 12/1971 | Brownson | 123/117 A |
| 3,521,609 | 7/1970 | Kashiwagi | 123/117 A |
| 3,698,366 | 10/1972 | Gropp | 123/117 A |
| 2,698,612 | 1/1955 | Schaefer | 123/117 A |

Primary Examiner—Laurence M. Goodridge
Assistant Examiner—Ronald B. Cox
Attorney—Keith L. Zerschling et al.

[57] ABSTRACT

An engine spark timing control system includes a conduit connecting carburetor spark port vacuum to the distributor servo actuator in parallel paths one of which contains an orifice for normally slowly advancing and retarding the ignition timing as a function of changes in spark port vacuum; the system also including a device that has a valve operable in response to predetermined acceleration movements of the throttle valve to disconnect or block the direct connection from the spark port to the distributor servo while at the same time connecting a vacuum reservoir to the distributor servo to artificially advance the ignition timing above the value that normally would be called for by the level of the vacuum at the spark port; the higher than normal advance decaying by bleed of the vacuum through the spark port line orifice until the vacuum level equals that at the spark port, at which time the ignition timing will be returned to normal; the device further including a vacuum pressure relief valve adjustable to limit the maximum level of vacuum in the reservoir so as not to unduly advance the ignition timing beyond a desired value.

15 Claims, 1 Drawing Figure

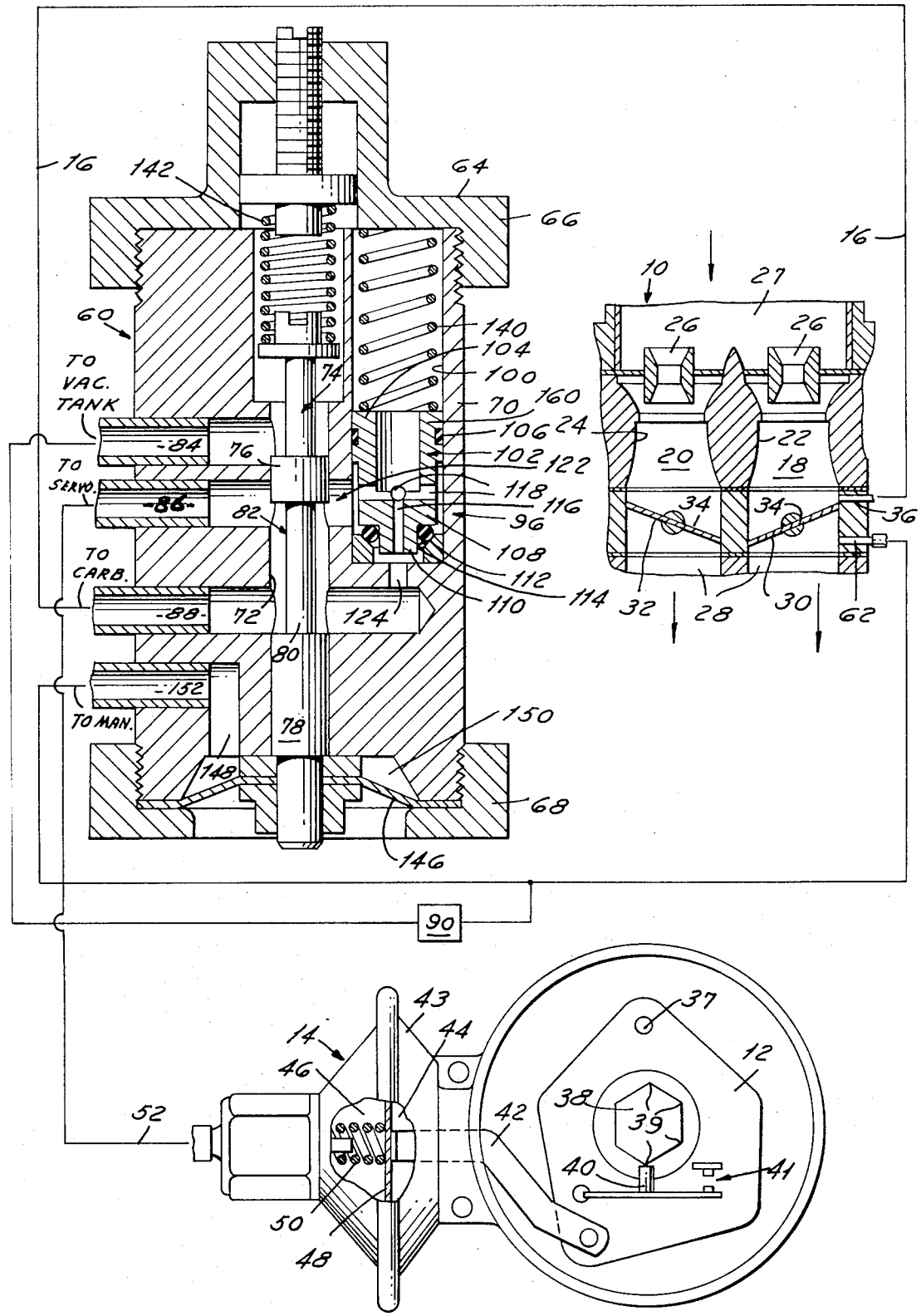

DISTRIBUTOR VACUUM SPARK ADVANCE CONTROL VALVE WITH REGULATOR

This invention relates, in general, to an engine spark timing control system. More particularly, it relates to one in which the engine timing is artificially advanced during heavy acceleration modes of operation to prevent backfiring through the carburetor, the ignition timing being returned to a normal setting after a predetermined time delay determined by a flow restricting passage in a vacuum regulator valve that limits the artificial advance of the timing to a desired value.

This invention is an improvement on the engine spark timing control shown and described in copending application Ser. No. 232,808 to T. H. Morris and T. Y. Wu, Engine Spark Timing System Control, filed Mar. 8, 1972, and having a common assignee. The latter application is directed to an engine ignition timing control that temporarily advanced the spark timing during accelerative modes of operation to prevent backfiring through the carburetor. The use of lower compression ratio engines to utilize low lead fuel generally lengthens the total combustion period to a point where at high engine rpms, for example, during accelerations, the combustion may continue through the power stroke into a portion of the intake stroke. A portion of the burning mixture may then pass through the open intake valve into the intake manifold from where a pressure pulse wave may pass back into the carburetor.

The device shown in Ser. No. 232,808 eliminates the backfiring problem by temporarily advancing the engine ignition timing during accelerations so that the burning charge does not reach the intake manifold. This is done by connecting an auxiliary source of vacuum at a higher level from a tank to the distributor servo actuator during accelerations, the auxiliary vacuum then decaying by bleed to spark port vacuum level through an orifice.

The source of auxiliary vacuum for the storage tank is a manifold vacuum port in the carburetor induction passage. During vehicle decelerations, it is possible for the manifold vacuum level to the very high, say, 25-30 inches hg. Under certain operating conditions, the reservoir vacuum could possibly advance the ignition timing far higher than would be desirable, since detonation then may result. It may even be possible, with the device described in Ser. No. 232,808 quickly accelerating after a temporary deceleration, to provide a staged action with a progressively increasing vacuum level so that the ignition could be advanced temporarily as much as 30°–40°.

The invention eliminates the above disadvantage by providing a vacuum regulator valve with a built-in flow restriction that operates automatically to limit the maximum value of reservoir vacuum that can act to temporarily advance the ignition during accelerations.

It is an object of the invention, therefore, to provide an engine spark timing system of the type shown in Ser. No. 232,808 with a vacuum regulator valve to variably limit the maximum temporary advance during heavy accelerations of the vehicle.

It is a further object of the invention to provide an engine spark timing system with a variable pressure relief valve to selectively maximize the vacuum level supplied to artificially advance the ignition timing during accelerations.

Other objects, features and advantages of the invention will become more apparent upon reference to the succeeding detailed description thereof, and to the drawing illustrating a preferred embodiment thereof, wherein the FIGURE illustrates schematically a cross-sectional view of an engine spark timing system embodying the invention.

The FIGURE includes only those portions of an engine ignition timing system that are typical components, such as, for example, a carburetor 10, a distributor breaker plate 12, a vacuum servo 14 to control the movement of breaker plate 12, and a vacuum line 16 connected between the carburetor and vacuum servo. The latter normally automatically changes the engine spark timing setting as a function of changes in engine vacuum spark port setting.

More specifically, the carburetor 10 is this instance is of the downdraft type and shows the primary and secondary bores 18 and 20 of a four-barreled carburetor. Both primary and secondary bores are constructed in a similar manner. Both constitute air/fuel induction passages having the usual fixed area venturis 22, 24. Booster venturis 26 are also provided, through which the main supply of fuel is drawn from means not shown, in a known manner. The bores are open at their upper ends 27 to clean air generally discharged from an air cleaner assembly, and at their lower ends are adapted to be connected to a conventional intake manifold 28. The bores contain primary and secondary throttle valves 30 and 32 respectively, controlling flow through each of the respective passages. The throttle valves are fixed on shafts 34 rotatably mounted in the walls of the carburetor body. The throttle valves are shown in an essentially closed idle speed position and can be rotated to an essentially vertical wide open throttle valve position.

The primary induction passage 18 is provided with a spark port 36 located above the closed position of the primary throttle plate. The spark port reflects the essentially atmospheric pressure level in the inlet when the throttle valve is closed, or the changes in engine manifold vacuum as the throttle valve rotates toward a fully opened position.

As stated previously, the distributor includes a breaker plate 12 that a pivotally mounted at 37 on a stationary portion of the distributor, and movable with respect to a cam 38. The latter has six peaks 39 corresponding to the number of engine cylinders. Each peak cooperates with the follower 40 of a breaker point set 41 to make and break the spark connection in a known manner for each one-sixth, in this case, rotation of cam 38. Pivotal movement of the breaker plate 12 in a counterclockwise spark retard setting direction, or in a clockwise spark advance setting, is provided by an actuator 42 slidably extending from vacuum servo 14.

Servo 14 may be of a conventional construction. It has a hollow housing 43 whose interior is divided into an atmospheric pressure chamber 44 and a vacuum chamber 46 by an annular flexible diaphragm 48. The diaphragm is fixedly secured to actuator 42, and is biased in a rightward retard direction by compression spring 50. Chamber 44 has an atmospheric or ambient pressure vent, not shown, while the chamber 46 is connected to a line 52.

During engine-off and other operating conditions to be described, atmospheric pressure exists on both sides of the diaphragm 48, permitting spring 50 to force the actuator 42 to the lowest advance or a retard setting position. Application of vacuum to chamber 46 moves diaphragm 48 and actuator 42 toward line 52 to an engine sprak timing advance position, by degree, as a function of the change in vacuum level.

Turning now to the invention, the ignition system includes a control 60 between the servo chamber 46 and connections to the spark port 36 and to a manifold vacuum port 62. The latter is located in the induction passage 18 below the closed position of the primary throttle 30. The device consists of a valve body 64 having opposite end portions 66 and 68 screwed to a main body portion 70. The valve body has an axial valve bore 72 in which is slidably mounted a spooltype valve 74. The latter consists of a pair of spaced lands 76 and 78 connected by a neck portion 80 of reduced diameter providing an annular chamber 82.

The valve controls communication between a number of passages 84, 86 and 88. Passage 84 is connected to the outlet of a vacuum reservoir or accumulator 90 having an inlet connected to the manifold vacuum port 62. The passage 86 is connected to line 52 leading to servo vacuum chamber 46. The line 88 is connected as shown by line 16 to the carburetor spark port 36.

The line 86 and 88 are extended beyond the valve 74, as shown, and are interconnected by a vacuum regulator device 96. The valve body 70 is provided with a second bore 100 in which is slidably and adjustably mounted a vacuum regulator valve 102. The latter has a land 104 at one end grooved at 106 to reduce friction and to trap foreign particles. The land is connected to a reduced diameter portion 108 having a stem 110. Surrounding the stem is an O-ring 112 cooperating with a conical valve seat 114 fixed at the bottom of the bore 100.

A reduced diameter or restricted bore 116 connects opposite sides of the valve 102 and constitutes an orifice or a flow restricting passage of predetermined size delaying communication of pressures on opposite sides of the valve. More specifically, the valve is provided with a number of through holes 118 in its side wall cooperating at one point with a port 122 in the valve body that communicates with the chamber 82. A port 124 communicates the bore 100 with the extension of passage 88.

The regulator valve is biased to the position shown by a spring 140 having a predetermined preload thereon.

Returning now to the construction of the valve 74, an adjustable load compression spring 142 normally biases the valve downwardly from the position shown to a position connecting lines 84 and 86 while blocking line 88. The opposite end of valve 74 is fixed to an annular flexible diaphragm 146 subjected to the force of manifold vacuum acting thereon through a passage 148, a chamber 150 and a passage 152 connected to the manifold vacuum pressure port 62.

In operation, with the engine running but the primary and secondary throttle valves 30 and 32 in closed or idle speed positions, servo chamber 46 will be at an atmospheric pressure level and the ignition timing will be in a maximum retarded setting. The force of main spring 142 will be chosen such that slight decreases in manifold vacuum will not be able to move the valve 74 from the position shown. Accordingly, light vehicle accelerations by slowly opening the primary throttle valve 30 in a conventional manner will position the valve 74 to connect the carburetor spark port vacuum in passage 88 through valve chamber 82 to the distributor line 86. This will then advance the ignition timing by degree in porportion to the increase in spark port vacuum. Decelerations of the engine will maintain a high manifold vacuum in line 152 acting on the end of the valve 74 and, therefore, maintain it in the position shown. The ignition timing then will be retarded by the essentially atmospheric pressure then present in the carburetor spark port line 88. It will be clear, of course, that the carburetor line 88 and servo line 86 are also interconnected by means of the valve 102 through the restricted passage 116. However, since flow through the chamber 82 is unrestricted, restriction 116 will be ineffective. The only effect it might have at this time is, if, for example, the manifold vacuum level decreases sufficiently to permit spring 142 to begin moving the valve 74 downwardly, then the progressive blocking off of the distributor servo line 86 may bring the restriction 116 into play.

Assume now, for example, that the vehicle operator rapidly depresses the primary throttle 30 towards a wide open throttle position. This will also, of course, open the secondary throttle plates. The manifold vacuum level at this time, therefore, will immediately decay to almost a zero value, or essentially atmospheric pressure level. This, when reflected in chamber 150, will permit the full force of spring 142 to quickly move the valve 74 downwardly to its extreme position. This will immediately connect the high manifold vacuum from tank 90 in line 84 to the distributor servo line 86 while blocking the connection between line 86 and the carburetor spark port line 88 other than through the flow restricting passage 116 in the regulator valve device 102. Accordingly, it will be seen that immediately the high vacuum in the reservoir or tank 90 will artificially trigger the servo 14 to advance the ignition timing to a setting above that normally called for by the essentially atmospheric pressure level at the spark port 36. The existence of the flow restricting passage 116, however, immediately begins to bleed the high vacuum to the carburetor spark port level so that the advance slowly decays towards a normal setting. Therefore, after a time delay determined by the size of orifice 116, the level of vacuum in line 84 will be that in line 88, which will have risen with the increase in vehicle rpms.

Assume now that the engine is running at essentially high rpms and that the throttle valves are then closed and the engine allowed to decelerate. The manifold vacuum at this time may reach a value of 25 inches hg., which of course is reflected in the vacuum reservoir or accumulator 90. Additionally, at high rpms., the mechanical fly weights (not shown) normally associated with a distributor of this type, may cause a centrifugal advance alone amounting to as much as 38°. If, therefore, now the engine is reaccelerated by opening wide the throttle valves, the control valve 74 will be immediately shifted downwardly to reflect the vacuum tank vacuum to the servo chamber 46. This, coupled with the centrifugal advance, can advance the timing immediately by as much as say 60° total. This would be undesirable. For example, advancing the ignition timing to too high a value may cause detonation during accelerations. Therefore, it would be desirable to have a regulator to limit the maximum amount of vacuum available from the tank to advance the timing temporarily. This regulator is provided by the device 60 previously described.

The spring 140 biasing the regulator valve 102 downwardly to the position shown is provided with a preload that will determine the maximum vacuum level available for temporarily advancing the spark ignition. That is, assume the preload on spring 140 is such that for any vacuum acting on the upper end 160 of valve 102 in excess of 15 inches hg., the force of the spring 140 will be overcome by the higher pressure level in the carburetor passage 88 acting on the lower end of valve 102 to move it up. This will directly connect the carburetor spark port passage 88 to passage 86 through the connecting port 122 and around the valve land 76. Accordingly, any time that the vacuum reservoir pressure in line 84 exceeds 15 inches of mercury, for example, then when the valve 74 is moved downwardly to connect the reservoir line 84 to the distributor servo line 86, the vacuum regulator valve 102 will move off its seat and immediately decay the reservoir vacuum in vacuum line 86 and chamber 46 to the preset level chosen by the force of spring 140.

From the above, therefore, it will be seen that the invention prevents an unnecessarily and undesirably high temporary advance of the ignition timing during conditions of acceleration following immediate decelerating modes of operation. It will also be seen that the maximum temporary advance can be controlled to a desired level merely by adjusting the preload on the vacuum regulator valve 102.

While the invention has been described and illustrated in connection with its preferred embodiment, it will be clear to those skilled in the arts to which it pertains that many changes and modifications may be made thereto without departing from the scope of the invention.

I claim:

1. A spark timing control for an engine having a carburetor induction passage with a spark port above the idle speed position of the throttle valve, a distributor breaker plate spring biased in a spark timing retarded setting direction, vacuum servo means normally moving the breaker plate in an advanced timing direction as a function of increases in spark port vacuum applied thereto, conduit means connecting the spark port to the servo means, and control means including supplemental force means connectable at times to the servo means for momentarily advancing the timing to a spark setting advanced above that which would normally be called for according to the level of vacuum at the spark port in response to predetermined accelerative modes of operation of the engine, and including means rendering the force means ineffective for subsequently returning the timing to the spark timing setting called for by the spark port pressure level, and further means to control the level of temporary advance.

2. A spark timing control as in claim 1, the force means including a vacuum reservoir, further means including vacuum responsive means movable to regulate the maximum advance attained temporarily by the control means, and a flow restricting passage connecting the spark port at all times to the servo means to decay reservoir vacuum at times.

3. A spark timing control as in claim 1, the further means comprising a pressure relief valve openable by vacuum from the reservoir acting thereagainst above a predetermined level to connect spark port pressure to the reservoir to decay the vacuum therein to a value permitting closing of the pressure relief valve, the relief valve including a flow restricting passage connecting spark port pressure at all times to the servo means.

4. A spark timing control as in claim 2, including a second conduit means connected between the vacuum reservoir and the servo means, and valve means between the conduit means movable to alternately connect the servo means to the first and second conduit means.

5. A spark timing control as in claim 4, including means connecting the vacuum reservoir to engine manifold vacuum so as to be subject to the changes therein.

6. A spark timing control as in claim 4, including means to move the valve means in a variable manner so as to porportionally connect the servo means to the first and second conduit means as a function of the movement of the valve means.

7. A spark timing control as in claim 1, the conduit means having a bypass passage in parallel flow relationship to the conduit means and containing a flow restricting means to at times control the change in pressure level at the servo means.

8. A spark timing control as in claim 3, the control means including a second conduit means connected to the vacuum reservoir at one end and at the other end to the first conduit means between the flow restriction means and the servo means, and a valve means normally biased to a first position connecting the spark port vacuum through the first conduit means and bypass passage to the servo means and disconnecting the servo means and the vacuum reservoir, and means rendered operative in response to a predetermined opening movement of the throttle valve to move the valve means to a second position blocking the first conduit means while connecting the bypass passage and vacuum reservoir to the servo means to advance the timing by application of the higher vacuum level in the reservoir to the servo means until the higher vacuum is decayed by bleed of higher pressure thereto from the spark port through the flow restricting means.

9. A spark timing control as in claim 4, including manfold vacuum responsive means to move the valve means between alternate positions.

10. A spark timing control as in claim 4, including a second servo secured to the valve means and responsive to manifold vacuum changes for moving the valve means, and including spring means biasing the valve means to one position.

11. A spark timing control as in claim 8, the valve means being movable in response to intake manifold vacuum connected thereto to act thereon.

12. A spark timing control as in claim 3, the control means including a valve body having a spool valve slidably mounted therein, the spool valve having a pair of spaced lands controlling communication of pressure first between branches of the conduit means connected one to the spark port and another to the servo means and second between the other branch and a line to the vacuum reservoir, the valve body including a flow restricting passage connecting the spark port branch and the servo means in a parallel arrangement whereby movement of the spool valve to a first position to connect the reservoir line and servo means branch also slowly bleeds the reservoir vacuum to the spark port pressure in the one branch until the pressures are equalized.

13. A spark timing control as in claim 12, including a second servo connected to the spool valve, spring means biasing the spool valve to the first position, and passage means connecting manifold vacuum to the servo means to move the spool valve in a variable manner as a function of manifold vacuum changes to a second position connecting the one and other branches while blocking the reservoir vacuum line.

14. A spark timing control as in claim 13, including spring means normally biasing the pressure relief valve to a closed position providing communication of pressures between the carburetor and servo means to occur in this position of the relief valve only through the flow restricting passage whereby the bleed of vacuum in the reservoir to the servo means is controlled.

15. A spark timing control as in claim 3, including means to adjust the predetermined level.

* * * * *